Dec. 25, 1934.  C. E. SWENSON  1,985,531

METHOD OF MAKING UNIVERSAL JOINTS

Filed June 6, 1932  2 Sheets-Sheet 1

Inventor:
Carl E. Swenson
By Wilson, Dowell, McCanna & Rehm
Attys.

Dec. 25, 1934.  C. E. SWENSON  1,985,531

METHOD OF MAKING UNIVERSAL JOINTS

Filed June 6, 1932  2 Sheets-Sheet 2

Inventor
Carl E. Swenson
By
Wilson, Dowell, McCanne & Rehm
Attys.

Patented Dec. 25, 1934

1,985,531

UNITED STATES PATENT OFFICE 1,985,531

METHOD OF MAKING UNIVERSAL JOINTS

Carl E. Swenson, Rockford, Ill.

Application June 6, 1932, Serial No. 615,496

32 Claims. (Cl. 29—148)

This invention relates to an improved trunnion type universal joint.

In the universal joint with which my invention is concerned, the bearing blocks are fastened to the yoke members and fit on the trunnions of the intermediate spider member, the yokes having arcuate pilot shoulders machined thereon at a predetermined radius for abutment by arcuate surfaces accurate ground on the ends of the blocks in a predetermined relation to accurate machined flat end thrust bearing surfaces provided in said blocks, so that when the arcuate surfaces on the blocks are in abutment with the aforesaid arcuate pilot shoulders on the yokes the proper small number of thousandths of an inch clearance is provided between the accurately ground flat ends of the trunnions and the end thrust bearing surfaces. The abutment of the blocks with the machined shoulders on the yoke members not only accurately locates the blocks for trunnion end clearance, as just stated, but relieves the block fastening means of the load incident to the end thrust.

The principal object of my invention lies in the novel method of producing arcuate abutment surfaces on the ends of the blocks in extremely accurate relation to flat end thrust bearing surfaces inside the blocks, consisting in providing a rotating arbor provided with pilot posts, corresponding very nearly in length to the trunnions of the spider member, on which the bearing blocks are arranged to be mounted in the grinding operation with the flat end thrust surfaces bearing against the ends of the pilots for accurate location of the blocks on the arbor. Thus, assuming that the pilots on the arbor having their ends at the proper radius with respect to the axis of rotation, it is clear that the arcuate abutment surfaces on the ends of the bearing block may be ground at an accurate radius and in an accurate predetermined relation to the end thrust bearing surfaces in said blocks, so that when the blocks are later mounted on the yoke members, the trunnions will have their ends properly related to the end thrust bearing surfaces with a small number of thousandths of an inch clearance. This method makes for accurate centering of the group of bearings with respect to the shafts, and accordingly is a step toward more accurate dynamic balance, and also, as stated, insures the correct clearance at the end thrust bearing surfaces so that there will be no binding of parts and the joint will run freely, smoothly, and quietly.

The invention is illustrated in the accompanying drawings, in which—

The same reference numerals are applied to corresponding parts throughout the views.

Figure 1:
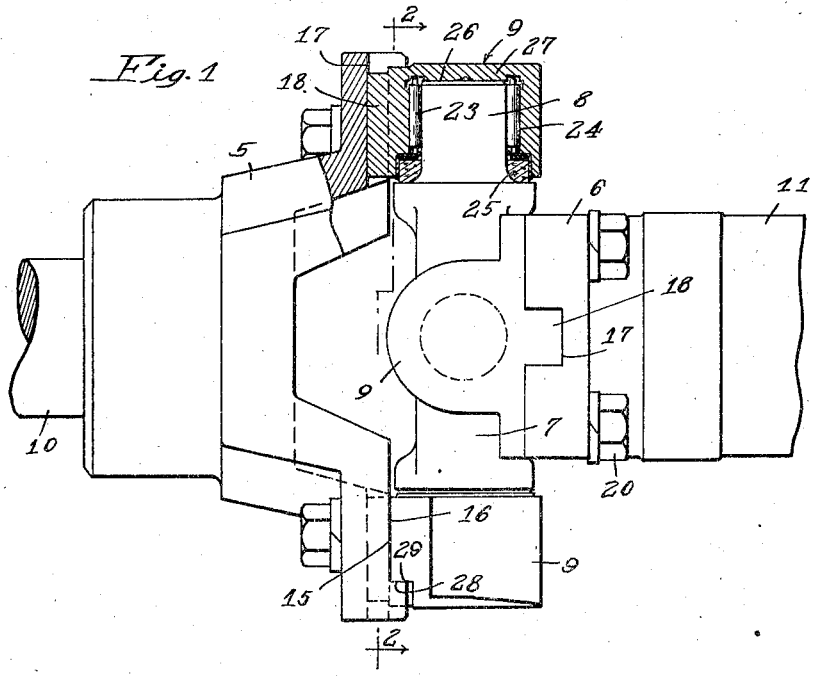
Figure 1 is a side view of a universal joint made in accordance with my invention showing one of the bearings in longitudinal section.

The universal joint illustrated, briefly stated, consists of a pair of yokes or terminal coupling members 5 and 6 connected by means of an intermediate transmission member 7, often referred to as the spider, the same providing four trunnions 8, 90° apart. The trunnions are received in cup-shaped bearing blocks 9, each yoke being equipped with one pair of these bearings in diametrically opposed relation. The yokes 5 and 6 are suitably connected to driving and driven members, the yoke 5 in this instance turning with a shaft 10, and the yoke 6 with a shaft 11. The spider 7 is usually made hollow so as to provide a central lubricant reservoir, the opposite sides of which are closed by plates 12 welded or otherwise suitably secured in place. Radial holes are provided in the trunnions 8 communicating with the reservoir to conduct lubricant therefrom to the bearing blocks 9. The reservoir is filled by removal of a plug 13 from an opening in the spider, air being bled from the reservoir from a suitable check valve 14, so as to allow the injection of a predetermined amount of lubricant. While, of course, any fluid or semi-fluid lubricant might be used, I have found what is commonly called cup grease satisfactory and fill the joint completely, the escape of grease from the valve 14 being relied upon to show when the joint is filled.

The yokes 5 and 6 are preferably machine finished on all surfaces so as to have a true dynamic balance. The surfaces 15, therefore, provide smooth seats for abutment by flat faces 16 provided on the backs of the blocks 9. The yokes are milled to provide radial slots 17 for reception of radial lugs 18 on the blocks 9, and are bored as at 19 on opposite sides of the slots 17 to receive bolts 20 which thread in holes 21 in lugs 22 formed on the bearing blocks, whereby to clamp the latter to the yokes. The holes 19 are purposely made slightly larger than the diameter of the bolts 20 for a purpose which will appear later. The holes 19, in other words, are not intended to affect the location of the bearing blocks but simply accommodate the bolts for clamping the blocks to the yokes, the location of the blocks being accurately determined in another way in accordance with the present invention, as will soon appear. It is apparent from the construction thus far described that good torque transmitting connections are provided between the bearing blocks and the respective yokes, and the bolts 20 are relieved of any part of that load.

The bearing blocks 9 may be constructed to provide any suitable or preferred type of bearings, so far as the present invention is concerned. Thus I have shown antifriction rollers 23 which make for easier and smoother operation than plain journal bearings, and, consequently, more efficient power transmission and longer life. These rollers run on the side of the trunnions 8 on the one hand, and on the other hand, have bearing contact with the side wall 24 of the cylindrical bearing recess provided in the blocks. The rollers are suitably retained in the blocks so that each block with its complement of rollers is a unit which may be removed and replaced with facility, for inspection, repair or replacement. Suitable packing means is provided on each bearing to seal the same against loss of lubricant or entry of dirt and water. Each bearing, in addition to providing lateral bearing support for its trunnion, has an accurately machined flat bearing surface 26 provided on the inside of the end wall 27 thereof to assume end thrust.

In accordance with my invention, I provide arcuate pilot shoulders 28 on the yokes 5 and 6 for engagement with companion arcuate surfaces 29 on the bearing blocks 9. The surfaces 29 are properly related to the end thrust bearing surfaces 26 so that the ends of the trunnions will have a predetermined clearance with respect to the surfaces 26 when the blocks are mounted on the yokes with the surfaces 29 in engagement with the shoulders 28, that is, enough clearance to prevent binding and allow free movement of the parts but not enough to interfere with smooth and quiet operation. This arrangement manifestly also relieves the block fastening means 20 of the load incident to end thrust. The bolts 20, in other words, simply clamp the blocks 9 to the yokes. The reason for making the bolt holes 19 in the yokes larger than the diameter of the bolts 20 must now be apparent; it allows the bearing blocks to be shifted slightly with respect to the yokes before tightening the bolts to bring the surfaces 29 into tight engagement with the shoulders 28, whereupon the tightening of the bolts completes the assembling with the bearing blocks solidly and accurately mounted on the yokes.

Figure 2:
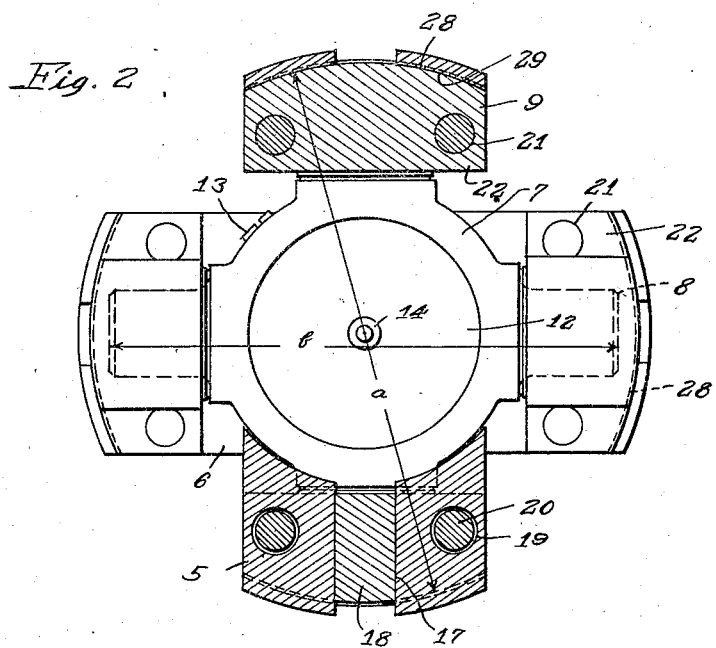
Fig. 2 is a transverse section on the broken line 2—2 of Figure 1.
Figure 3:
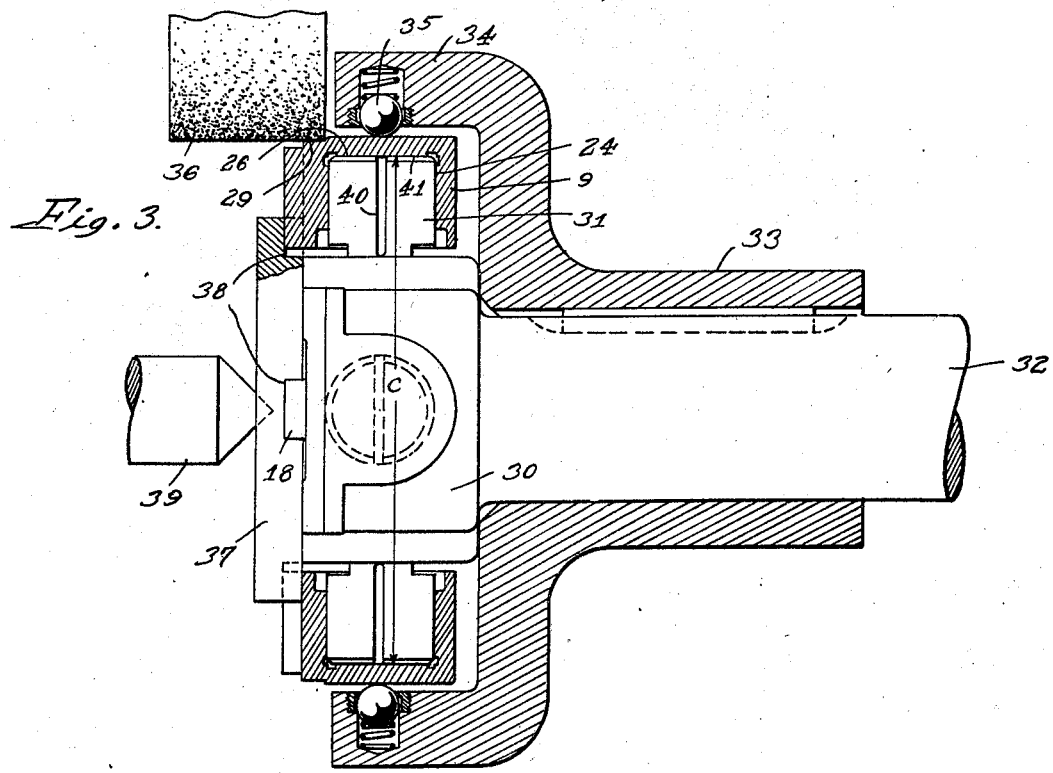
Fig. 3 is a view of the grinding arbor partly in longitudinal section, illustrating the method of grinding the abutment surfaces on the bearing blocks.
Figure 4:
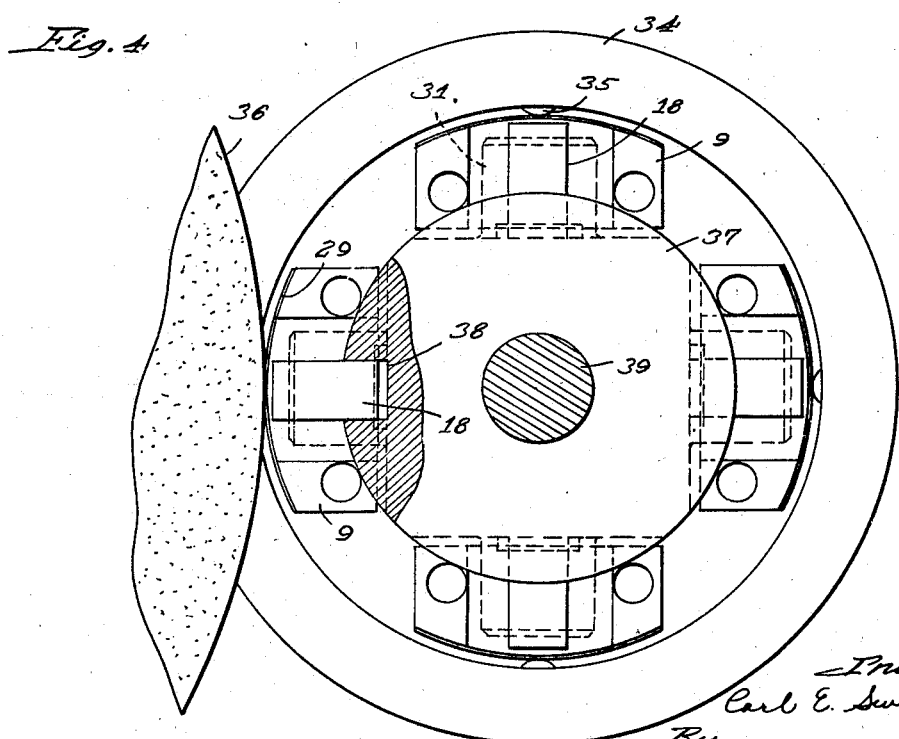
Fig. 4 is an end or face view of the arbor.

As stated before, my invention has to do with the novel method of manufacture to make for accurate centering of the group of bearings with respect to the shafts 10 and 11 so as to secure more accurate dynamic balance. In accordance with this method it will be observed in Fig. 2 that the shoulders 28 on the yokes 5 and 6 are arcuate and machined concentric with the axis of the yoke members to give a certain diametrical dimension $a$ between these shoulders. It is clear, therefore, that if I produce the arcuate surfaces 29 on the blocks 9 so that they, too, are truly concentric with the axis of the yoke members, while the blocks are supported accurately at the same distance from center and in a truly radial plane, in substantially the same positions they occupy when assembled on the member 7 of the universal joint, the result is that the group of bearings will be accurately centered with respect to the yokes of the joint when the surfaces 29 are disposed in abutment with the shoulders 28, and the assembly will have a more accurate dynamic balance than is obtainable in other ways, assuming the same exercise of care. In order at the same time to insure the proper clearance between the end thrust bearing surfaces 26 and the ends of the trunnions 8, the surfaces 29 must, of course, be produced with proper regard to the dimension $b$ measured from the end of one trunnion 8 to the end of the diametrically opposite trunnion of the spider 7. For that reason I provide a spider type arbor or fixture 30 with radial pilot posts 31, corresponding to the trunnions 8, which has the dimension $c$ measured from the end 41 of one post 31 to the end 41 of the diametrically opposite post, which dimension equals the dimension $b$ plus from 1 to about 5 thousandths of an inch, depending on the clearance which it is desired to secure between the ends of the trunnions 8 and the end thrust bearing surfaces 6. For example, if the difference between dimensions $b$ and $c$ is, say .004 inch, there will be approximately a .002 inch clearance at the end of each of the opposed trunnions 8 when the bearing blocks 9 are subsequently assembled on the yokes, with the trunnions received therein. The bearing blocks 9 are arranged to be placed on the posts 31 of this "dummy" spider with the end thrust surfaces 26 bearing against the flat ends 41 of the posts as clearly appears in Fig. 3, for the grinding of the arcuate surfaces 29. The spider 30 has an axial shank 32 on which a hub 33 is splined so as to be slidable to and from block holding position. The hub 33 has an annular flange 34 in which suitable spring pressed detents 35 are provided to hold the blocks 9 in place on the posts 31 with surfaces 26 tightly engaging surfaces 41 while the surfaces 29 are being ground by means of the grinding wheel 36. An annular flange 37 is formed on the spider 30 in the same relation to the posts 31 as one of the yokes is disposed with relation to the trunnions 8. The reason for this relationship is that it permits entering the radial lugs 18 of the bearing blocks 9 in radial slots 38 provided on the flange, whereby to keep the blocks from turning on the posts during the grinding operation. The slots 38, in other words, correspond to the slots 17 on the yokes of the universal joint. The arbor as a whole is centered, as indicated at 39, and revolved, and the grinding wheel, which is also being revolved, is fed toward the work carefully until the diameter measured between diametrically opposed shoulders 29 is equal to the dimension $a$ or bears some predetermined relationship to that dimension, so that when the blocks 9 are removed from the pilot posts 31 and properly assembled on the yokes 5 and 6, they will be accurately centered as a group with respect to the shafts 10 and 11 so as to make for accurate dynamic balance, and in addition will have the end thrust bearing surfaces 26 in proper small clearance relationship to the ends of the trunnions 8 of the spider 7 to make for smooth and quiet operation and minimum wear.

The posts 31 are suitably split, as indicated at 40, so as to have a snug fit in the cylindrical bearing recesses 24 in the bearing blocks. The posts are, of course, larger in diameter than the trunnions 8 to make up for the absence of the anti-friction rollers 23. The posts are chamfered on the ends, as indicated, so as to facilitate entry in the recesses 24.

It is believed the foregoing description conveys a good understanding of all of the objects and advantages of my invention. The appended claims are drawn so as to cover all legitimate modifications and adaptations.

I claim:

1. The method of manufacturing universal joints of a type comprising a pair of opposed yoke members, an intermediate spider having trunnions, and bearing blocks adapted to fit on the trunnions and be fastened to the yoke members, which method comprises machining concentric arcuate shoulders on the yoke members to a predetermined diametrical dimension relative to the dimension between the ends of opposed trunnions, mounting the bearing blocks on a rotatable support so that the blocks are approximately in the same relation to the axis of rotation that they will assume subsequently on the spider in a completed joint, rotating the blocks with the support, and during rotation forming arcuate surfaces on the outside of the bearing blocks to approximately the first dimension, whereby when the blocks are subsequently removed and placed on the trunnions and fastened to the yoke members with the arcuate shoulders on the blocks engaging the arcuate surfaces on the yoke members, said blocks are accurately centered as a group with respect to the yoke members and spider for good dynamic balance.

2. The method of manufacturing universal joints of a type comprising a pair of opposed yoke members, an intermediate spider having trunnions, and bearing blocks adapted to fit on the trunnions and be fastened to the yoke members, the blocks having end thrust bearing surfaces therein adapted to engage the ends of the trunnions, which method comprises machining concentric arcuate shoulders on the yoke members to a predetermined diametrical dimension relative to the dimension between the ends of opposed trunnions, mounting the bearing blocks on a rotatable support so that the blocks are in the same relation to the axis of rotation, except for a small allowance for end clearance, that they will assume subsequently on the spider in a completed joint, then rotating the blocks with the support, and during rotation forming arcuate surfaces on the outside of the bearing blocks to approximately the first dimension, whereby when the blocks are subsequently removed and placed on the trunnions and fastened to the yoke members with the arcuate shoulders on the blocks engaging the arcuate surfaces on the yoke members, said blocks are accurately centered as a group with respect to the yoke members and spider for good dynamic balance, and the end thrust bearing surfaces in the blocks have a predetermined end clearance with respect to the ends of the trunnions.

3. The method of manufacturing universal joints of a type comprising a pair of opposed yoke members, an intermediate spider having trunnions, and bearing blocks adapted to fit on the trunnions and be fastened to the yoke members, which method comprises supporting a number of bearing blocks in positions grouped substantially as they will ultimately be grouped on the spider of a completed joint, and performing the same machining operation on each of the blocks while so disposed, whereby to insure a predetermined relationship between the group of blocks and the spider when the blocks are removed and placed on the trunnions of the spider.

4. The method of manufacturing universal joints of a type comprising a pair of opposed yoke members, an intermediate spider having trunnions, and bearing blocks adapted to fit on the trunnions and be fastened to the yoke members, which method comprises supporting a number of bearing blocks for rotation while in positions grouped substantially as they will ultimately be grouped on the spider of a completed joint, rotating the group of blocks, and performing an arcuate grinding operation on the bearing blocks during their rotation, whereby to insure a predetermined relationship for each bearing block to the yoke member associated therewith, when the blocks are removed and placed on the trunnions of the trunnion member and fastened to the yoke members.

5. The method of manufacturing universal joints of a type comprising a pair of opposed yoke members, an intermediate spider having trunnions, and bearing blocks adapted to fit on the trunnions and be fastened to the yoke members, wherein the yoke members have concentric arcuate shoulders adapted to be engaged by the bearing blocks, which method comprises supporting a number of bearing blocks for rotation while in positions grouped substantially as they will ultimately be grouped on the spider of a completed joint, rotating the group of blocks, and during rotation machining arcuate surfaces on the outside of the bearing blocks to fit the arcuate shoulders on the yoke members, whereby when the blocks are removed and placed on the trunnions and fastened to the yoke members, they will have proper engagement with the arcuate shoulders on the yoke members and at the same time be disposed in a predetermined relation to the trunnions of the spider.

6. The method of manufacturing bearing blocks for universal joints of the trunnion type, wherein each bearing block is to have a shoulder provided thereon in a predetermined relation to the end of the trunnion on which the block is mounted, which method comprises supporting a group of bearing blocks for rotation in positions corresponding to their ultimate positions on the trunnions of a completed joint, and performing a machining operation on the blocks while so disposed, to produce the shoulders on the blocks.

7. The method of manufacturing bearing blocks for universal joints of the trunnion type, wherein each bearing block is to have an arcuate shoulder provided thereon in a predetermined relation to the end of the trunnion on which the block is mounted, which method comprises supporting a group of bearing blocks for rotation in positions corresponding approximately to their ultimate positions on the trunnions of a completed universal joint and at approximately the same radius with respect to the axis of rotation, rotating the group of blocks while so supported, and machining arcuate surfaces on the outside of the bearing blocks to a prescribed radius.

8. In the manufacture of cup-shaped bearing blocks for universal and pivotal joints of the trunnion type, the steps of first machining end thrust surfaces on the inside of the end walls of the blocks, then solidly supporting said blocks by said surfaces on a rotary arbor at a predetermined radius from the axis of rotation, the radius including a specified number of thousandths of an inch for ultimate clearance between the end thrust surfaces and the ends of related trunnion members subsequently to be entered in the bearing blocks, then revolving said blocks while thus solidly supported, and in the revolution of the blocks accurately turning arcuate locating surfaces on the outer ends thereof to a predetermined radius and accurate predetermined relationship to the end thrust surfaces.

9. In the manufacture of cup-shaped bearing blocks for universal and pivotal joints of the trunnion type, the steps of first machining end thrust surfaces on the inside of the end walls of the blocks, then subjecting said blocks to hardening, then solidly supporting said blocks by said surfaces on a rotary arbor at a predetermined radius from the axis of rotation, the radius including a specified number of thousandths of an inch for ultimate clearance between the end thrust surfaces and the ends of related trunnion members subsequently to be entered in the bearing blocks, then revolving said blocks while thus solidly supported, and in the revolution of the blocks accurately grinding arcuate locating surfaces on the outer ends thereof to a predetermined radius and accurate predetermined relationship to the end thrust surfaces.

10. The method of producing universal joints of that type in which an intermediate trunnion member is located between opposed yoke members, and bearing blocks fitted on the trunnions are fastened to the yoke members, including the step of placing the bearing blocks on a fixture having posts corresponding to the trunnions of the trunnion member of the universal joint, and machining said blocks while so disposed to insure thereby a predetermined relationship between the blocks and the trunnion member when the blocks are subsequently positioned on the trunnions of said trunnion member and fastened to the yoke members.

11. The method of producing universal joints of that type in which an intermediate trunnion member is located between opposed yoke members, and bearing blocks fitted on the trunnions are fastened to the yoke members, including the step of placing the bearing blocks on a fixture having posts corresponding to the trunnions of the trunnion member of the universal joint, rotating the fixture with the bearing blocks in position on the posts, and machining said blocks while so disposed whereby to insure a predetermined relationship between the blocks and the trunnion member when the blocks are subsequently positioned on the trunnions of said trunnion member and fastened to the yoke members.

12. The method of producing universal joints of that type in which an intermediate trunnion member is located between opposed yoke members, and bearing blocks fitted on the trunnions are fastened to the yoke members, including the step of placing the bearing blocks on a fixture having posts corresponding to the trunnions of the trunnion member of the universal joint, rotating the fixture with the bearing blocks in position on the posts, and machining arcuate surfaces on the outside of the bearing blocks while they are so disposed to fit arcuate shoulders on the yoke members of the universal joint, whereby to insure a predetermined relationship between the blocks and the trunnion member and yoke members when the blocks are subsequently positioned on the trunnions of the trunnion member and fastened to the yoke members.

13. The method as set forth in claim 12 including the step of making the arcuate shoulders on the yoke members concentric with respect to the axis of rotation thereof and to a predetermined diametrical dimension relative to the dimension across opposed trunnions of t trunnion member of the universal joint.

14. The method of making pivotal joints of t type in which bearing blocks fit on trunnions one member and are fastened to another mem of the joint, including the step of placing bear blocks on a fixture having posts corresponding the trunnions of the trunnion member, and m chining the blocks while so disposed to inst thereby a predetermined relationship between t blocks and the trunnion member when the blo are subsequently positioned on the trunnions said trunnion member and fastened to the oth member.

15. The method of making pivotal joints of type in which bearing blocks fit on trunnions one member and are fastened to another mem of the joint, including the step of placing bear blocks on a fixture having posts corresponding the trunnions of the trunnion member, rotat the fixture with the bearing blocks in position the posts, and machining the blocks while so c posed to insure thereby a predetermined relatic ship between the blocks and the trunnion mem when the blocks are subsequently positioned the trunnion of said trunnion member and f tened to the other member.

16. The method of making pivotal joints of type in which bearing blocks fit on trunnions one member and are fastened to another mem of the joint, including the step of placing bear blocks on a fixture having posts corresponding the trunnions of the trunnion member, rotat the fixture with the bearing blocks in position the posts, and machining arcuate surfaces on outside of the bearing blocks while they are disposed to fit arcuate shoulders on the ot member of the joint, whereby to insure a p determined relationship between the blocks a the trunnion member and other member when blocks are subsequently positioned on the tri nions of the trunnion member and fastened the other member.

17. The method as set forth in claim 16 incli ing the step of making the arcuate shoulders the last mentioned other member concentric w respect to the axis of operation thereof and t predetermined diametrical dimension relative the dimension across opposed trunnions of trunnion member.

18. The method of making universal joints the type consisting of a pair of yokes, an int mediate spider having four trunnions, and f bearing blocks fitting on the trunnions and f tened in pairs to the yokes, which method cons in forming arcuate shoulders of a predetermi radius on yokes, mounting bearing blocks o: rotary support so that they are at a predetermi radius from the axis of rotation and, during rc tion of said support, forming arcuate shoulc on the blocks approximately to the first rad whereby the shoulders on the yokes and blc interfit for accurate location of the blocks w the same are removed from the support assembled on the yokes.

19. The method of making pivotal joints of type wherein bearing blocks fit on trunnions one member and are secured to another mem of the joint, which method consists in form arcuate shoulders of a predetermined radius the second member, mounting bearing blocks a rotary support so that they are at a prede mined radius from the axis of rotation and, c ing rotation of said support, forming arcu shoulders on the blocks approximately to the 1 radius, whereby the shoulders on the second member and on the blocks interfit for accurate location of the blocks when the same are removed from the support and assembled on the members of the joint.

20. The method of making universal joints of the type consisting of a pair of yokes, an intermediate spider having four trunnions, and four cup-shaped bearing blocks fastened on the yokes and fitting on the trunnions with the end walls engaging the ends thereof, which method consists in forming internal arcuate shoulders of a predetermined radius on yokes, mounting bearing blocks on a rotary support so that their end walls are at a predetermined radius from the axis of rotation and, during rotation of said support, forming external arcuate shoulders on the blocks approximately to the first radius, whereby the shoulders on the yokes and blocks interfit for accurate location of the blocks, and the end walls of the blocks have a working fit on the ends of the trunnions, when the blocks are removed from the support and assembled on the yokes.

21. The method of making pivotal joints of the type wherein cup-shaped bearing blocks fastened on one member fit on trunnions on another member of the joint with the end walls of the blocks engaging the ends of the trunnions, which method consists in forming arcuate internal shoulders of a predetermined radius on the first member, mounting bearing blocks on a rotary support so that their end walls are at a predetermined radius from the axis of rotation and, during rotation of said support, forming arcuate external shoulders on the blocks approximately to the first radius, whereby the shoulders on the first member and on the blocks interfit for accurate location of the blocks, and the end walls of the blocks have a working fit on the ends of the trunnions, when the blocks are removed from the support and assembled on the members of the joint.

22. The method of making universal joints of the type consisting of a pair of yokes, an intermediate spider having four trunnions, and four bearing blocks fitting on the trunnions and fastened in pairs to the yokes, which method consists in forming arcuate shoulders of a predetermined radius on yokes with the axis of rotation as a center, and forming arcuate shoulders on bearing blocks approximately to the same radius, whereby the shoulders on the yokes and blocks interfit for accurate location of the blocks when the same are subsequently assembled on the yokes.

23. The method of making pivotal joints of the type wherein bearing blocks fit on trunnions on one member and are secured to another member of the joint, which method consists in forming arcuate shoulders of a predetermined radius on the second member with the axis of rotation as a center, and forming arcuate shoulders on bearing blocks approximately to the same radius, whereby the shoulders on the second member and on the blocks interfit for accurate location of the blocks when the same are assembled on the members of the joint.

24. The method of making universal joints of the type consisting of a pair of yokes, an intermediate spider having four trunnions and four cup-shaped bearing blocks fastened on the yokes and fitting on the trunnions with the end walls engaging the ends thereof, which method consists in forming internal arcuate shoulders of a predetermined radius on yokes with the axis of rotation as a center, and forming external arcuate shoulders on bearing blocks approximately to the same radius whereby the shoulders on the yokes and blocks interfit for accurate location of the blocks, and the end walls of the blocks have a working fit on the ends of the trunnions, when the blocks are assembled on the yokes.

25. The method of making pivotal joints of the type wherein cup-shaped bearing blocks fastened on one member fit on trunnions on another member of the joint with the end walls of the blocks engaging the ends of the trunnions, which method consists in forming arcuate internal shoulders of a predetermined radius on the first member with the axis of rotation as a center, and forming arcuate external shoulders on the bearing blocks approximately to the same radius, whereby the shoulders on the first member and on the blocks interfit for accurate location of the blocks, and the end walls of the blocks have a working fit on the ends of the trunnions, when the blocks are assembled on the members of the joint.

26. The method of making pivotal joints of a type wherein bearing blocks fit on trunnions on one member and are secured to another member of the joint, which method comprises supporting bearing blocks in positions substantially as they will ultimately be disposed on the first member, and performing the same machining operation on each of the blocks while so disposed, whereby to insure a predetermined relationship between the blocks and the joint member when the blocks are placed on the trunnions.

27. The method of making pivotal joints of a type wherein bearing blocks fit on trunnions on one member and are secured to another member of the joint, which method comprises supporting bearing blocks for rotation while in positions substantially as they will ultimately be disposed on the first member, rotating the blocks, and performing an arcuate grinding operation on the blocks during their rotation, whereby to insure the proper relationship for each block to the first member when the blocks are placed on the trunnions and secured to the other member.

28. The method of making pivotal joints of a type wherein bearing blocks fit on trunnions on one member and are secured to another member of the joint, wherein the second member has concentric arcuate shoulders adapted to be engaged by the bearing blocks, which method comprises supporting bearing blocks for rotation while in positions substantially as they will ultimately be disposed on the first member, rotating the blocks, and during rotation machining arcuate surfaces on the blocks to fit the arcuate shoulders on the second member, whereby when the blocks are placed on the trunnions of the first member and secured to the second member they will have proper engagement with the arcuate shoulders and at the same time be disposed in a predetermined relation to the trunnions of the first member.

29. The method of making bearing blocks for pivotal joints of the trunnion type wherein each bearing block is to have a shoulder provided thereon in a predetermined relation to the end of the trunnion on which the block is mounted, which method comprises supporting several bearing blocks for rotation in positions corresponding to their ultimate positions on the trunnions of a completed joint, and performing a machining operation on the blocks while so disposed, to produce the shoulders on the blocks.

30. The method of manufacturing bearing blocks for pivotal joints of the trunnion type, wherein each bearing block is to have an arcuate shoulder provided thereon in a predetermined relation to the end of the trunnion on which the block is mounted, which method comprises supporting several bearing blocks for rotation in positions corresponding approximately to their ultimate positions on the trunnions of a completed pivotal joint and at approximately the same radius with respect to the axis of rotation, rotating the blocks while so supported, and machining arcuate surfaces on the outside of the bearing blocks to a prescribed radius.

31. In the manufacture of cup-shaped bearing blocks, the steps of first machining end thrust surfaces on the inside of the end walls of the blocks for ultimate bearing engagement on the ends of trunnions to be received in said blocks, then supporting said blocks by said surfaces for subsequent machining, and machining a locating surface on the outside of each block in a predetermined relation to the inside end thrust surface.

32. In the manufacture of cup-shaped bearing blocks; the steps of first machining flat end thrust surfaces on the inside of the end walls of the blocks for ultimate bearing engagement on the flat ends of trunnions to be received in said blocks, then supporting said blocks by said flat surfaces for subsequent machining, and machining an arcuate locating surface on the outside of each block in a predetermined relation to the inside end thrust surface.

CARL E. SWENSON.

CERTIFICATE OF CORRECTION.

Patent No. 1,985,531.                                     December 25, 1934.

CARL E. SWENSON.

It is hereby certified that error appears in the printed specification of the above numbered patent requiring correction as follows: Page 3, first column, lines 25 and 52, claims 1 and 2, respectively, for "shoulders" read surfaces; and lines 26 and 53, of said claims, for "surfaces" read shoulders; and page 5, first column, line 50, claim 22, for "shouders" read shoulders; and that the said Letters Patent should be read with these corrections therein that the same may conform to the record of the case in the Patent Office.

Signed and sealed this 19th day of February, A. D. 1935.

Leslie Frazer (Seal)                                            Acting Commissioner of Patents.